J. E. WORTHMAN.
Car-Brakes.
No. 155,356. Patented Sept. 22, 1874.
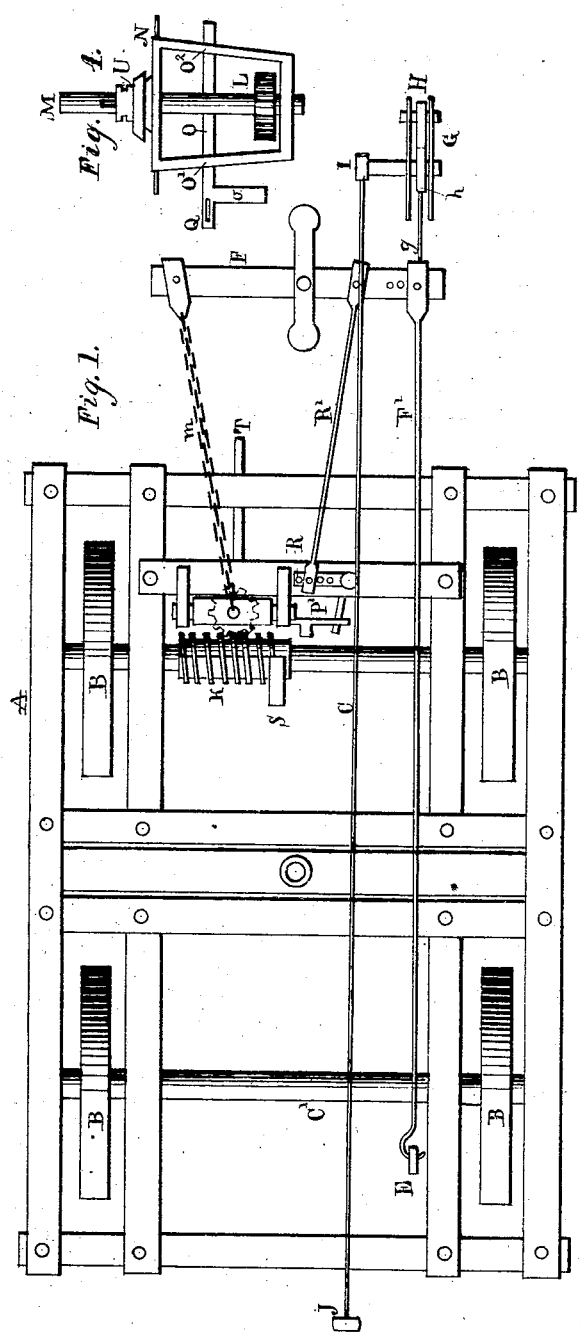
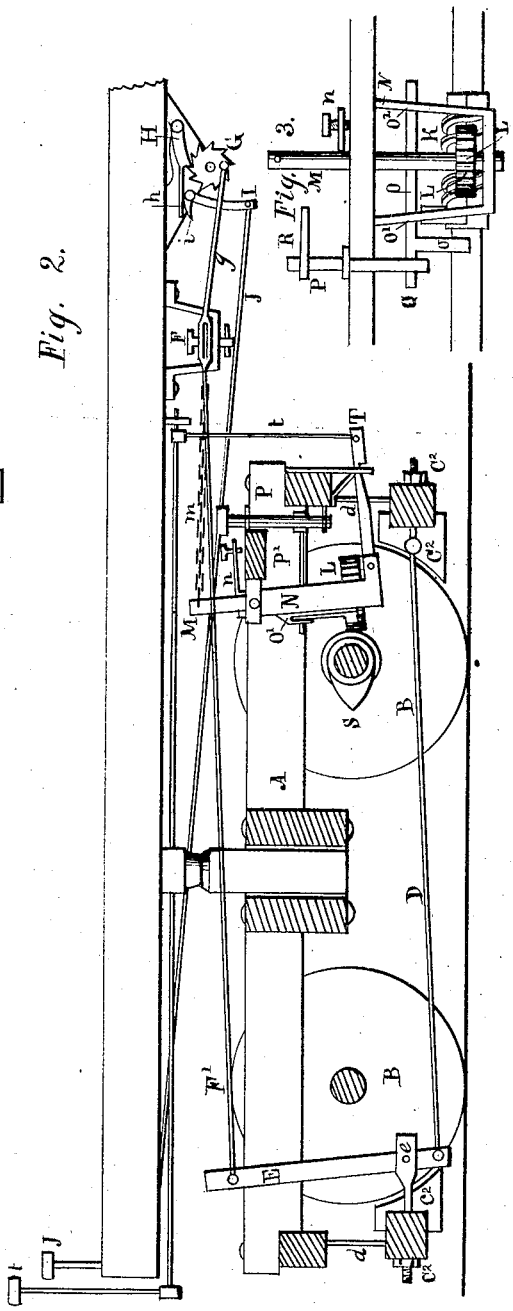
Witnesses:
Wm. H. Ross Jr. M.D.
Thomas C. Brady
Inventor:
John E. Worthman.

UNITED STATES PATENT OFFICE.

JOHN E. WORTHMAN, OF MOBILE, ALABAMA.

IMPROVEMENT IN CAR-BRAKES.

Specification forming part of Letters Patent No. 155,356, dated September 22, 1874; application filed April 4, 1874.

*To all whom it may concern:*

Be it known that I, JOHN E. WORTHMAN, of Mobile, in the county of Mobile and State of Alabama, have invented an Improved Car-Brake, of which the following is a specification:

The invention relates to the construction and arrangements of parts for automatic application and release of the brakes, as hereinafter described.

Figure 1 is a top view. Fig. 2 is a longitudinal section. Fig. 3 is a detached view of the worm-wheel or pinion and endless worm or screw gear, and Fig. 4 shows the frame N provided with a friction-clutch.

A represents the truck of a tender or car; B B', the wheels; and C C¹ the axles. C² is a brake-bar, having near each end a brake-shoe, $c^2$, which bears upon the periphery of the wheels B B'. This bar C² is attached by a connection, D, to a lever, E, that is pivoted in a projection, $e$, on a brake-bar, C³, of the other wheels. These bars C² C³ are attached to pendants $d\ d$, which are pivoted on the frame of truck. F is a yoke attached to the bottom of a tender or car. This yoke F is attached by a connection, F', to the brake-lever E. G is a ratchet wheel or rack attached by a connection, $g$, to the yoke F. This ratchet wheel or rack G is provided with a spring-pressed pawl, H, in which the yoke F is locked, and which is provided with an arm, $h$. I is a lever whose eccentric $i$ bears against the pawl-arm $h$, and the lever-arm is attached to a hand-connection, J. By pulling the latter the spring-pressed pawl H is withdrawn, and the yoke F allowed to throw the lever E forward, and the brakes apart and off the wheels. This ratchet wheel or rack G may be dispensed with, and friction-clutch U, if preferable, used in place of it, as shown in Fig. 4—this friction-clutch U to be withdrawn with suitable mechanism on the same principle as the spring-pressed pawl H, thereby allowing the lever E to be thrown forward, and the brakes apart and off the wheels. The axle C is provided with a double or triple endless worm or screw, K, which works in a worm-wheel or pinion, L, on the vertical windlass-shaft M. To the drum or upper part of this shaft M is attached a chain, $m$, which is connected to the brake-yoke F. When the worm-wheel or pinion is thrown in gear the axle C will draw forward the arm of the yoke F, and set the brakes against the wheels. This yoke F may be dispensed with, as the connection can be made direct from the windlass-shaft M to the brake-lever E. N is a frame hinged to the frame of truck in which the shaft M turns on a pivot. This frame N is provided with a projection, $n$, provided with a set-screw, so as not to allow the worm-wheel to be thrown in gear too far. O is a cam-bar provided with a stud or projection, $o$. This cam-bar O slides in slots $o^1\ o^2$ in the frame N. P is a shaft turning vertically on a pivot, and is provided with a short arm, P', which engages in a slot, Q, of the cam-bar O. This shaft P is also provided with a lever, R. This lever R is attached by a connection, R', to the yoke F, by which the cam-bar O is caused to slide in the slots $o^1\ o^2$ of the frame N, when the yoke F is drawn forward and the brakes set against the wheels. On axle C is placed a cam, S, between which and the frame N comes, at the proper time, the stud or projection $o$ of the cam-bar O. T is a catch-lever or pawl, in which the frame N is locked, thereby holding the worm-wheel or pinion out of gear. This catch-lever or pawl T is itself released by means of the hand-connection $t$. By this construction and arrangement of parts, as soon as the catch-lever or pawl T is released, and the worm-wheel or pinion thrown in gear, the axle C makes one, or, if desired, more, revolutions, applies the brakes, causes the stud or projection $o$ of the cam-bar O gradually to pass between the frame N and the cam S, forces back the frame N, which throws the worm wheel or pinion out of gear and prevents any further strain upon the brake-bars. In order to increase the degree of power applied to the brakes, the lever R is provided with a series of holes or other suitable mechanism, at different distances from its fulcrum, so that, by moving the connection between it and the yoke F closer to or more remote from said fulcrum, the cam-bar O will be moved more or less slowly, and thus allow the force upon the brake-bars to be increased or diminished. According as the change is made the cam-bar O is brought sooner or later between the frame N and the cam S, and, in consequence, the winding up of the chain continues a longer or shorter time, and the power applied to the brakes is greater or less. Connecting the shaft M with the similar brake mechanism of each car in a train by a cord, chain, rod or other suitable flexible connection, enables the brakes of each car to be applied simultaneously, and with a uniform power. By connecting the rod, cord, or chain $t$ with a bell-rope extending through all the cars, a passenger, in case of accident, can throw the worm-wheel in gear by pulling the bell-rope, and thus apply the brakes.

The construction of gearing can also be made of friction-pulleys in place of the endless worm or screw, and the worm-wheel or pinion. A friction-pulley can be placed on the axle of a truck of a tender or car in place of the endless worm or screw, and another on the shaft M in place of the worm-wheel. The face of these pulleys can be made V shape or otherwise, and can be covered with wood, leather, or other suitable material.

The gear mechanism can also be easily and conveniently operated by a lever coming within reach of the engineer, fireman, brakeman, or conductor, both for the purpose of releasing and to apply the brakes.

It is not necessary that the means for operating separately the brakes for each car should be dispensed with, and they may, therefore, be preferably retained.

Having thus described my invention, what I claim as new, and desire to secure by Letters Patent, is—

1. The combination, with the pivoted frame N, shaft P, spur-gear L, and worm-gear, of the axle, the notched bar T, ratchet, spring-pawl, eccentric $i$, lever I, and rod connection with a trip, as shown and described, to operate as specified.

2. The perforated lever R, the shaft-arm P′, rod R′, and lever E, in combination with the shifting cam-bar O, as shown and described, for the purpose specified.

3. The frame N, the projection $n$ with set-screw, the slots $o^1$ $o^2$, the cam-bar O, having the stud $o$, and the slot Q, the shaft P, having the short arm P′, and lever R, the catch-lever T, and the cam S, combined as and for the purpose set forth.

JOHN EDWARD WORTHMAN.

Witnesses:
   Wm. H. Ross, Jr., M. D.,
   Thomas C. Brady.